United States Patent [19]

Copeland et al.

[11] 4,176,455
[45] Dec. 4, 1979

[54] PLOTTING APPARATUS

[76] Inventors: Thomas M. Copeland, Rte. 1, Box 125-A, Columbia, S.C. 29203; Kenneth J. Feinberg, 619 King St., Apt. 604, Columbia, S.C. 29205; Alfred H. Vang, 4202 Sequoia Rd., Columbia, S.C. 29206

[21] Appl. No.: 771,775
[22] Filed: Feb. 24, 1977
[51] Int. Cl.[2] .............................................. G01D 7/10
[52] U.S. Cl. ................................. 33/1 M; 33/23 R
[58] Field of Search .......... 33/1 R, 1 M, 1 MR, 23 R, 33/23 C

[56] References Cited
U.S. PATENT DOCUMENTS 2,744,328   5/1956   Maximoff ........................... 33/1 MP

FOREIGN PATENT DOCUMENTS 783474   8/1957   United Kingdom .................... 33/1 MP Primary Examiner—William D. Martin, Jr.
Attorney, Agent, or Firm—Bailey, Dority & Flint

[57] ABSTRACT

A plotting apparatus is disclosed for use in an automatic plotting system including a first pivoted arm carried by a first pivoted support and a second pivoted arm adapted for carrying an instrument head mounted on a second pivoted support carried adjacent a free-end of said first arm. A power operated drive pivots the first and second arms through angles in response to the input of a pair of angular coordinate signals providing a high degree of resolution between points in the plotting operation.

15 Claims, 5 Drawing Figures ized reproduction systems,
wherein an operator may construct or reconstruct an
PLOTTING APPARATUS

BACKGROUND OF THE INVENTION

Automatic plotting systems are known and referred to in the art as interactive reproduction systems, wherein an operator may construct or reconstruct an object on a variety of mediums using a computer for processing and storing coordinate position data and for transmitting the data to control the operation of a plotting or cutting instrument.

The automatic reproduction system typically includes a mechanical X-Y plotting device having X and Y servo drive motors which control the position of the plotting or cutting instrument in response to the input of position data in the form of X and Y cartesian coordinates from a computer storage. While X and Y plotting devices are suitable for many plotting operations, the nature and mobility of such devices limits the number of points into which an object may be resolved and such devices cannot provide the high degree of resolution and accuracy required in many plotting operations. Moreover, prior rectangular coordinate plotting systems are typically limited to a particular resolution in that they are adapted to plot only a given number of points within a given unit of measure and this resolution cannot be conveniently varied from plot to plot. The plots from such a system can result in a number of lines oriented at discernible angles rather than appearing as smooth lines. Typically, the X-Y mechanical plotter operates on the principle of rolling friction and has a reduced effectiveness when cutting in a highly resistant medium such as wood, stone, metal, etc.

Accordingly, an important object of the present invention is to provide an improved mechanical plotting apparatus having increased mobility for use in accurately forming an object in an automatic reproduction system.

Another important object of the present invention is to provide a plotting apparatus for use in an automatic plotting system which provides a high degree of resolution and accuracy to the object being formed.

Another important object of the present invention is the provision of a plotting apparatus having a power drive which will operate the plotting or cutting instrument effectively in highly resistent mediums.

Yet another important object of the present invention is the provision of a plotting apparatus which is controlled by the input of angular coordinates and operates on the principle of angular rotational motion to provide an infinite degree of resolution and smooth lines in the plotting operation.

SUMMARY OF THE INVENTION

It has been found that a plotting apparatus having increased resolution and mobility may be provided for accurately plotting as well as for cutting in highly resistive mediums by utilizing a pair of arms mounted on pivoted supports which are rotated by power operated drives through angular increments in response to the input of angle coordinate signals. The angle coordinates may be divided and subdivided an infinite number of times so that the object being formed may be resolved into as many coordinate points as is necessary to provide the degree of resolution desired.

In an alternate embodiment, a plotter arm mounted on a pivoted support is rotated by a power operated drive through an angle in response to a first coordinate signal while the pivoted support is moved in rectilinear motion in response to a second coordinate signal to impart a translating movement to the plotter arm.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a plotting apparatus for use in an automatic reproduction system having an input source for supplying first and second control coordinate signals for controlling the position of the plotting apparatus. The plotting apparatus includes a pivoted arm adapted for carrying a plotting or cutting instrument. A power operated drive pivots the arm through an angle responsive to a first control coordinate signal, and imparts a translatory movement to the pivoted arm responsive to a second control coordinate signal.

In one embodiment, the power operated drive for imparting translatory movement to the pivoted arm is illustrated as including a pivoted support carrying the pivoted arm. An alternate embodiment of the power operated drive for imparting translatory movement to the pivoted arm is illustrated as including a support mounted for rectilinear motion carrying the pivoted arm.

Figure 1:
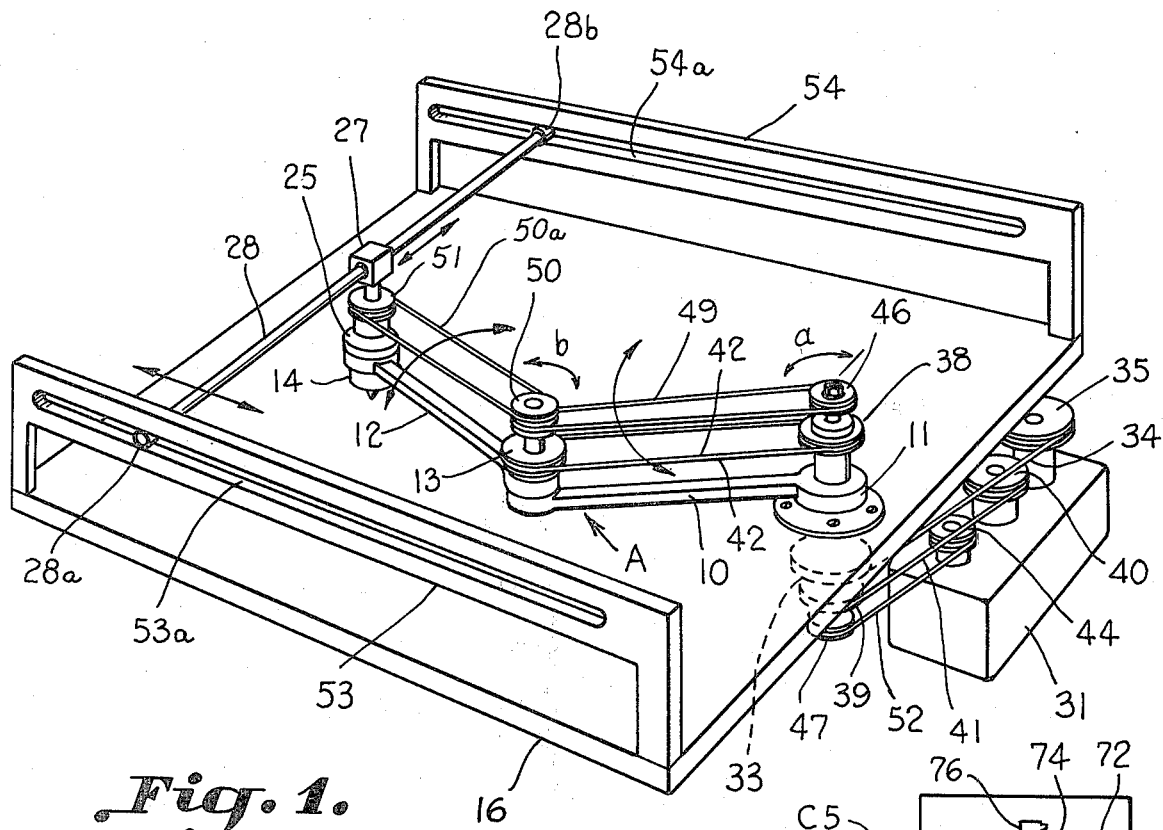
FIG. 1 is a perspective view illustrating a plotting apparatus constructed in accordance with the present invention.
Figure 1A:
FIG. 1A is a schematic illustration of means for vertically positioning a plotting instrument in accordance with the present invention.

Referring now to FIG. 1, a plotting apparatus is illustrated as including a plotting arm, designated generally as A, having a first arm 10 carried by a first pivoted support 11, and a second arm 12 carried by a second pivoted support 13 adjacent a free end of the first arm 10. A power operated drive means is provided for pivoting the first arm 10 through an angle, a, responsive to a first control coordinate signal C1, and for pivoting the second arm 12 through an angle, b, responsive to a second control coordinate signal C2. The second arm 12 is adapted for carrying an instrument head 14 and an instrument 15 for performing work on an associated workpiece. Drive means may be provided for rotating the instrument head 14 to control the direction thereof during plotting operations in response to a third control signal C3.

In the illustrated embodiment, the instrument 15 may be a conventional drawing instrument such as an ink pin for drawing or plotting an object on an associated workpiece (not shown) positioned on the top surface of a work board 16. It is to be understood of course, that instrument head 14 may be adapted for carrying many types of instruments such as for performing cutting or etching operations in a variety of mediums such as textiles, wood, marble, metal and the like. Other applications such as sewing patterns on fabrics could be made by adapting suitable instruments and machines to the instrument head. Electrical power for operating power instruments may be supplied by electrical wires (not shown) connected directly to the head 14.

Figure 2:
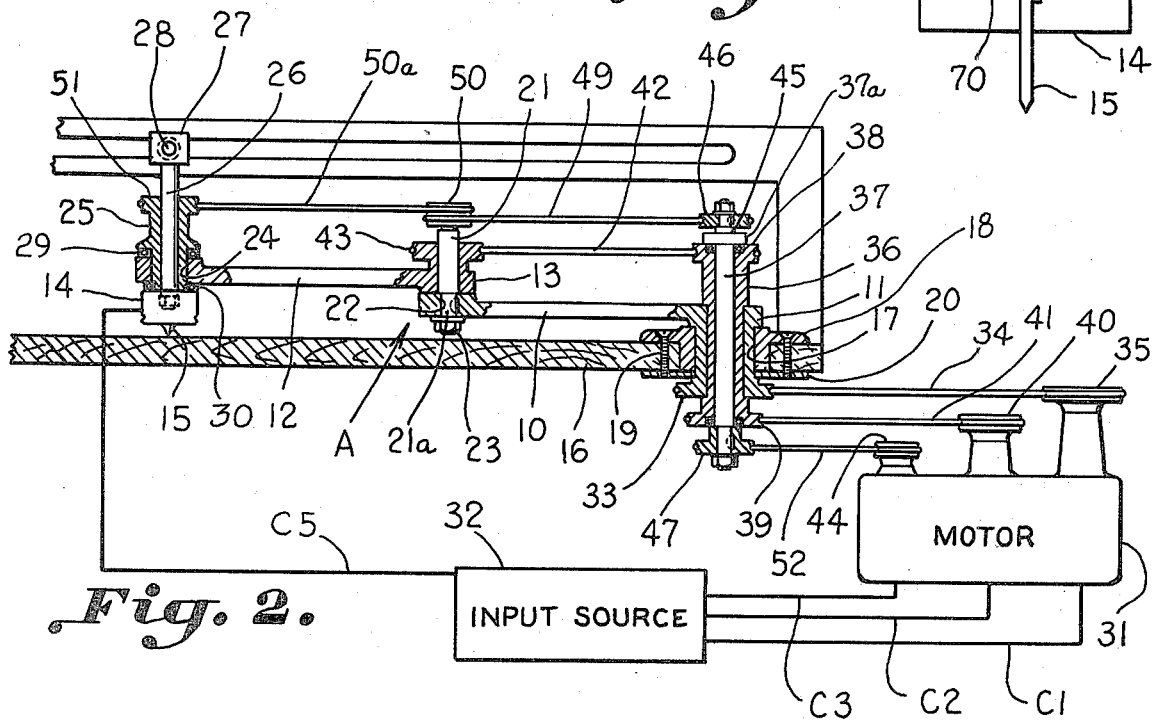
FIG. 2 is a partially cut away side elevational view of the apparatus of FIG. 1.

The means for positioning the plotting arms will now be more fully described. As illustrated in FIGS. 1 and 2, pivoted support 11 rotates in a central opening 17 of a hub member 18 secured to work board 16 by means of screws 19 and screw plate 20. The arm 10 may be made as one-piece with the pivoted support 11 or may be integrally connected therewith in any suitable manner. The pivoted support 13 is carried adjacent a remote end of arm 10 by means of an upstanding shaft 21 having a reduced spindle portion 21a received and keyed in an opening 22 forming in the remote end of arm 10. The enlarged diameter of shaft 21 provides a shoulder which rests on the top surface of arm 10 adjacent the opening 22 supporting the shaft thereon. The shaft is secured therein by means of a washer and nut combination 23. The support 13 may then be carried over shaft 21 for pivotal motion relative thereto. The arm 12 is made integral with the pivoted support 13 in any suitable manner such as by forming a one-piece structure.

The free end of arm 12 is adapted for carrying the instrument head 14 by means of a bearing opening 24 formed therein. A rotated support 25 is carried for rotation within the bearing opening 24 and is supported by means of an upright support shaft 26 attached at one end to a collar member 27 slidably mounted on a mobile support shaft 28. The other end of upright shaft 26 is secured to the rotated support 25 and instrument head 14 by a nut and washer combination received over a threaded end thereof to integrally connect the support 25 and the instrument head 14 so that they rotate together. Suitable sets of roller bearings 29 and 30 may be provided to facilitate the turning of the instrument head relative to the arm 12 and shaft 26. It is to be understood, of course, that a stationary instrument head may be utilized in any applications and that this arrangement is made for purposes of illustration. The instrument head 14 may be interchanged with heads having other instruments, and alternately, the instrument head 14 may be constructed so as to interchangeably carry a number of different instruments for performing various work operations and a variety of mediums.

The power operated drive for rotating or pivoting the arms 10 and 12 includes the pivoted supports 11 and 13 and means for rotating the supports. The illustrated embodiment of the power operated means contemplates utilizing a system of belt driven pulleys driven by a control motor shown schematically at 31 which, in turn, is controlled by the input of control coordinates C1 and C2. The input data is supplied from a data source which may be a general purpose computer and a processing system such as shown in U.S. Pat. No. 3,873,769. The motor box illustrated at 31 is preferably a system of three separate motors of the type generally referred to as servo motors operated by the electrical or other input signals C1, C2 and C3.

As illustrated, pivot support 11 includes a lower pulley 33 connected by way of a cable or belt 34 to a pulley 35 driven by the servo motor 31 in response to angular coordinate C1 resulting in the pivoting of arm 10 through the angle a. A rotating drive assembly 36 is carried on a shaft 37 co-axially with the pivoted support 11. The drive assembly 36 includes an upper pulley 38 and lower pulley 39. Lower pulley 39 is connected to a drive pulley 40 by a cable 41 so that drive assembly 36 is rotated through an angle responsive to angular coordinate C2. This increment of rotation is imparted to pivoted support 13 by means of a belt 42 connected between the pulley 38 and a pulley 43 which is an integral part of the pivoted support 13 resulting in the pivoting of arm 12 through the angle b. A collar 37a supports the shaft 37 atop the pulley 38 and suitable bearings are provided for rotation of drive assembly 36 about the shaft 37. The arrangement of hub 18, pivoted support 11, and drive assemblys 36 and 45 is made primarily for illustration and the design of the various components thereof which would enable them to be conveniently assembled concentrically and co-axially in the commercial embodiment would be well within the purview of the average mechanical designer.

In many applications such as in cutting textile patterns with a sabre saw, it is desirable to turn and control the direction of the instrument head 14 during operation of the apparatus to provide an additional wrist-type movement, as additional power drive pulley 44 may be utilized and controlled by the third coordinate signal C3 corresponding to the desired angular orientation of the head. To this end, an additional rotated drive assembly 45 is provided having an upper pulley 46 and a lower pulley 47 mounted on the reduced ends of shaft 37 keyed and affixed thereto by means of suitable nut and washer combinations as shown. The upper pulley 46 is connected by means of a drive belt 49 to a first groove of a transfer drive pulley 59 carried for rotation on uppermost end of the the upstanding shaft 21 attached to the end of arm 10. A second groove of transfer pulley 50 is connected by a belt 50a to an integral pulley 51 of the rotating support 25. The lower pulley 47 of drive assembly 45 is connected by a drive belt 52 to the drive pulley 44 which is rotated in angular increments responsive to C3 to turn the instrument head 14 accordingly through the above mentioned drive system.

To further support the instrument head 14 and provide structural support to the head when cutting through highly resistive mediums, a guide-support means is provided by a pair of spaced opposed sides 53 and 54 and the mobile support shaft 28 extending between the sides. The free ends 28a and 28b of shaft 28 are carried for free movement within longitudinal slots 53a and 54a formed along the length of the sides. The collar 27 and upright arm 26 supporting the instrument head 14 would then be permitted to slide freely in one direction along the support shaft 28 and in an orthogonal direction along the sides.

Figure 3:
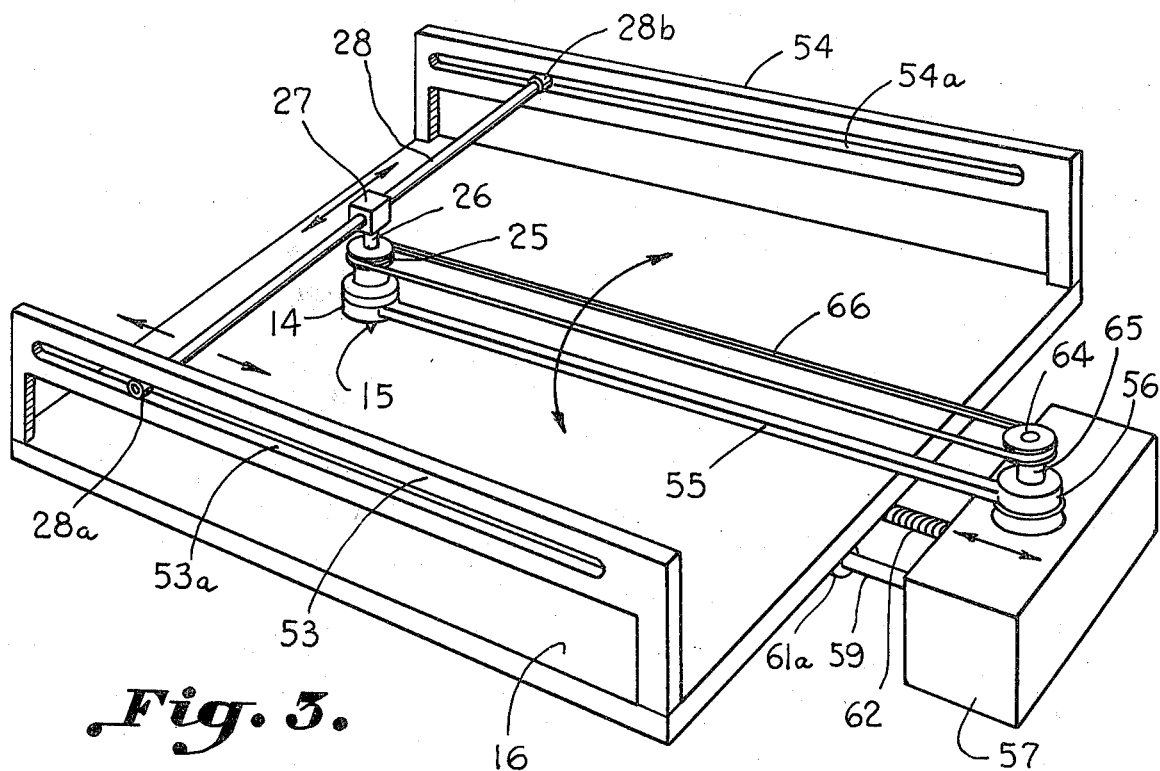
FIG. 3 is a perspective view illustrating an alternate form of the invention.
Figure 4:
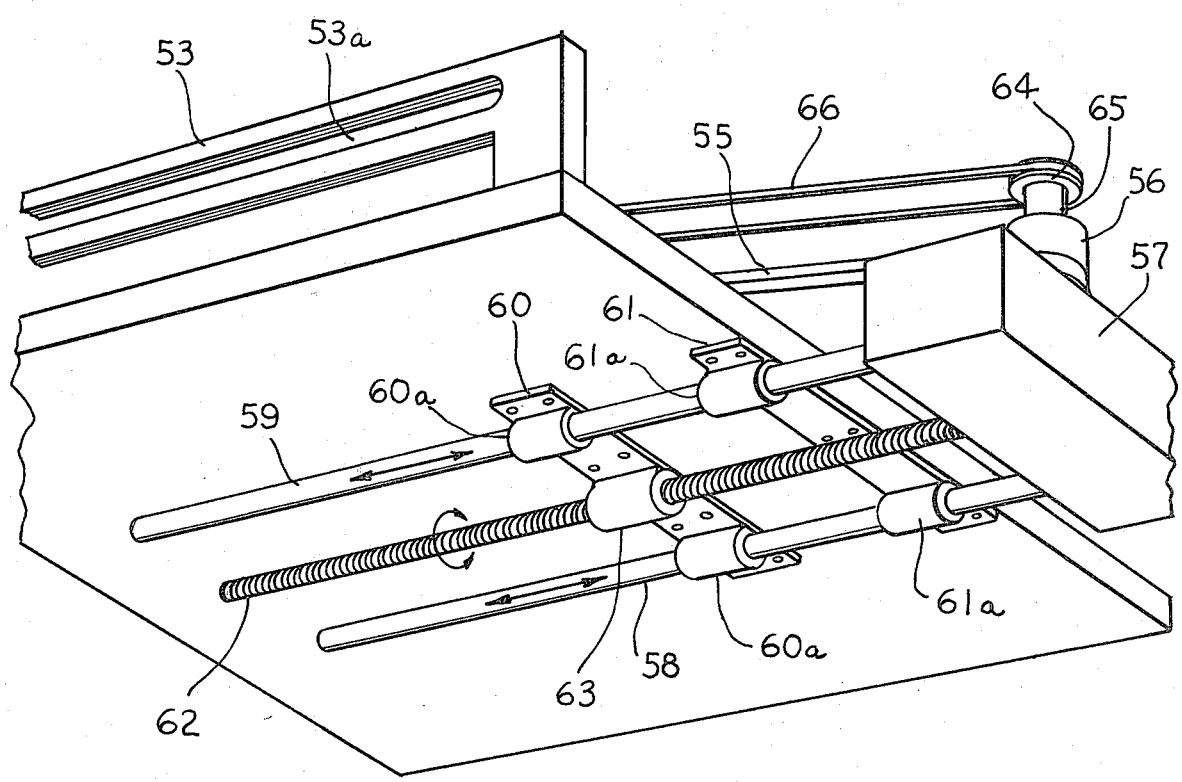
FIG. 4 is a perspective view taken from the bottom of the apparatus illustrated in FIG. 3 illustrating the power drive imparting translatory movement to the plotting arm of the apparatus.

Referring now to FIGS. 3 and 4, an alternate embodiment of the present invention is illustrated wherein a first control coordinate signal is input in the form of an angular coordinate, as in the case of C1, and a second coordinate control signal is input in the form of a rectilinear coordinate C4. While the embodiment of FIGS. 1 and 2 is highly mobile and provides a higher degree of resolution for the object image being plotted, the embodiment illustrated in FIGS. 3 and 4 is apaticularly advantageous for cutting operations performed in highly dense or resistant mediums such as wood, stone, and metals and like materials.

As illustrated, a pivoted arm 55 is mounted on a pivotal support 56. Power operated drive means is provided by a suitable control motor 57 to which the coordinate control signals are input in a conventional manner from an input source such as a general purpose computer in the manner illustrated schematically in FIG. 2. The pivoted support 56 may be connected directly to the output of an electrical motor of the type generally referred to as a servo motor. The pivoted support 56 pivots the arm 55 through an angle in response to the input of control coordinate signal C1 representing a precalculated angle coordinate. The power operated drive imparts a translatory movement to the pivoted arm 55 in response to the second control coordinate signal, C4, by means of a mount for the pivoted support 56 and the control motor box which is movable in rectilinear motion.

As viewed in FIG. 4, a pair of spaced support arms 58 and 59 are integral with the control motor box 57 and extend outwardly therefrom. A pair of bearing brackets 60 and 61 are suitably secured to the bottom of the work board 16 and include bearings 60a and 61a, respectively, which slidably mount the arms 59 and 58.

A threaded screw rod 62 cooperates with a threaded coupling 63 to move the control box 57 and pivot support 56 in linear motion. The screw member 62 may be connected in any conventional mechanical manner to the output of a second control motor within the motor box 57 so as to be rotated therewith moving the pivoted support 56 and arm 55 in translatory motion in response to the second control coordinate signal C4. C4 may represent a linear coordinate such as the Y coordinate in a conventional X-Y coordinate system which together with angular coordinate C1 define a coordinate pair and a point in a polar coordinate system.

It will be noted that a rotating drive means 64 is provided for altering the direction of the instrument head 14 in a similar manner as disclosed for the embodiment in FIGS. 1 and 2. The rotating drive includes a pulley 64 mounted atop a shaft 65 mounted coaxial with the pivoted support 56 and controlled by a third servo motor within the control box 57 in response to the control coordinate signal C3 as described in connection with FIG. 2. A drive belt 66 connects the rotating drive 64 with the pulley of rotating support 25 to turn the instrument head and control the direction thereof during plotting operations. An effective plotting instrument can be had in accordance with this embodiment which is generally stronger than the embodiment of FIG. 1 in that it has no free-hanging angle arm making it more effective when working in a resistant medium. This embodiment responds more slowly due to the screw locomotion of pivoted arm 55 as compared to the dobuled pivoted configuration of FIG. 1 which is highly responsive to the input of data thereto.

Control over the vertical position of the plotting instrument 15 is desirable in many operations such as when the design being formed calls for moving to another location on the plotting surface or when an etching blade is required to cut deeper into the media surface to form a bolder cut, etc. As illustrated in FIGS. 1-2, means for controlling the vertical position of the instrument point 15 is provided by a control motor 70 operated in response to a control signal C5. A power gear wheel 62 is driven by the motor 70 in response to C5 and meshes with teeth 74 of a position rack 76 integrally connected with the instrument point 15 to raise and lower the point accordingly. The motor 70 may be manually controlled by the input of the electrical C5 or automatic control may be had by imputing control signal C5 automatically through input source 32 together with coordinate control signals C1, C2, and C3 so that the instrument point 15 automatically assumes a desired vertical position at each coordinate point as required for the design. Suitable bearing structure may be provided in a commercial embodiment for slidably supporting the instrument and rack portions 76 within the instrument head 14 and in meshing relationship with gear 72.

It can thus be seen that a highly mobile and advantageous construction for a plotter apparatus can be had in accordance with the present invention providing an increased degree of resolution for the object image being plotted by angular control of the plotting apparatus. The plotting apparatus of the present invention responds to angular coordinates which may be divided into degrees, minutes, seconds, or any number of fractions of a second to provide an infinite degree of resolutions within the same unit of measure and all changes in directions can be made to represent smooth curves, as well as lines having angles. Furthermore, the plotting apparatus of the present invention has the advantage that it will more effectively operate in highly resistant mediums in that the apparatus relies on the mechanical principle of pulling and pushing and not on rolling friction as does the conventional X-Y motor driven plotters.

While a preferred embodiment of the invention has been described using specific terms, such description is for illustrative purposes only, and it is to be understood that changes and variations may be made without departing from the spirit or scope of the following claims.

What is claimed is:

1. A plotting apparatus for use in an automatic reproduction system having an input source for supplying first and second control coordinate signals to control the positioning of said plotting apparatus in making a plot on the associated workpiece, said plotting apparatus comprising:
    a work table for supporting said workpiece;
    a pivoted arm carried in a superposed postion above said work table;
    an instrument head carried by said pivoted arm adjacent a distal end thereof;
    a work instrument carried by said instrument head;
    power operated means operably connected to said pivoted arm for pivoting said arm through an angle responsive to a first control coordinate signal; and
    said power operated means imparting translatory movement to said pivoted arm responsive to a second control coordinate signal.

2. The structure set forth in claim 1, wherein said power operated means imparting translatory movement to said pivoted arm includes a pivoted support carrying said pivoted arm.

3. The structure set forth in claim 1, wherein said power operated means imparting translatory movement to said pivoted arm includes a support mounted for rectilinear motion carrying said pivoted arm.

4. The structure set forth in claim 1 including drive means for turning said instrument head so as to control the direction thereof.

5. The structure set forth in claim 1 wherein said power operated means for pivoting said arm through said angles includes a pivoted support carrying said pivoted arm.

6. The structure set forth in claim 5 including a second pivoted arm carrying said first mentioned pivoted support adjacent a free end thereof and wherein said power operated means for imparting translatory movement to said first mentioned pivoted arm includes a second pivotal support carrying said second pivoted arm.

7. A plotting apparatus for use in an automatic reproduction system of the type having an input source supplying first and second control coordinate signals to control the positioning of said plotting apparatus in making a plot in the associated workpiece, said plotting apparatus comprising:
  a work table for supporting said workpiece;
  a first pivoted arm supported in a superposed position adjacent said work table;
  a second pivoted arm carried on said first pivoted arm;
  an instrument head carried adjacent a free end of said second pivoted arm adapted for carrying an instrument for carrying out the desired operation,
  power operated means pivoting said first arm through an angle responsive to said first control coordinate signal, and
  said power operated means pivoting said second arm through an angle responsive to said second control coordinate signal.

8. The structure set forth in claim 7 wherein said power operated means includes a first pivoted support carrying said first arm and a second pivoted support carrying said second arm adjacent a free-end of said first arm.

9. The structure set forth in claim 8 including a rotating drive carried co-axially with said first pivoted support rotating said second pivoted support.

10. A plotting apparatus for use in an automatic reproduction system having an input source supplying first and second control coordinate signals comprising:
  a work table,
  a first arm carried above said work table by a first pivoted support,
  a second arm carried by a second pivoted support adjacent a free end of said first arm,
  power operated means connected to said first pivoted support for pivoting said first arm through an angle responsive to said first control coordinate signal,
  said power operated means connected to said second pivoted support for pivoting said second arm through an angle responsive to said second control coordinate signal,
  an instrument head carried by said second arm adapted for carrying an instrument for performing work on an associated workpiece carried by said work table, and
  drive means for rotating said instrument head to control the direction thereof.

11. The structure set forth in claim 10 wherein said power operated means includes a first rotating drive carried co-axially with said first pivoted support for rotating said second pivoted support.

12. The structure set forth in claim 11 including a second rotating drive carried co-axially with said first rotating drive, and a transfer drive carried co-axially with said second pivoted support connected to said second rotating drive and said instrument head for effecting rotation thereof.

13. The structure set forth in claim 10 including support means for supporting said instrument head independent of said second arm.

14. The structure set forth in claim 13 wherein said support means includes a pair of spaced opposed sides, an elongated member extending between said sides having opposing ends carried for free movement along the length of said sides, and an upright arm supporting said instrument head carried for free movement along the length of said elongated member.

15. The structure set forth in claim 10 wherein said instrument head includes means for adjusting the vertical position of said instrument carried thereby.

* * * * *